United States Patent Office 2,757,260
Patented July 31, 1956

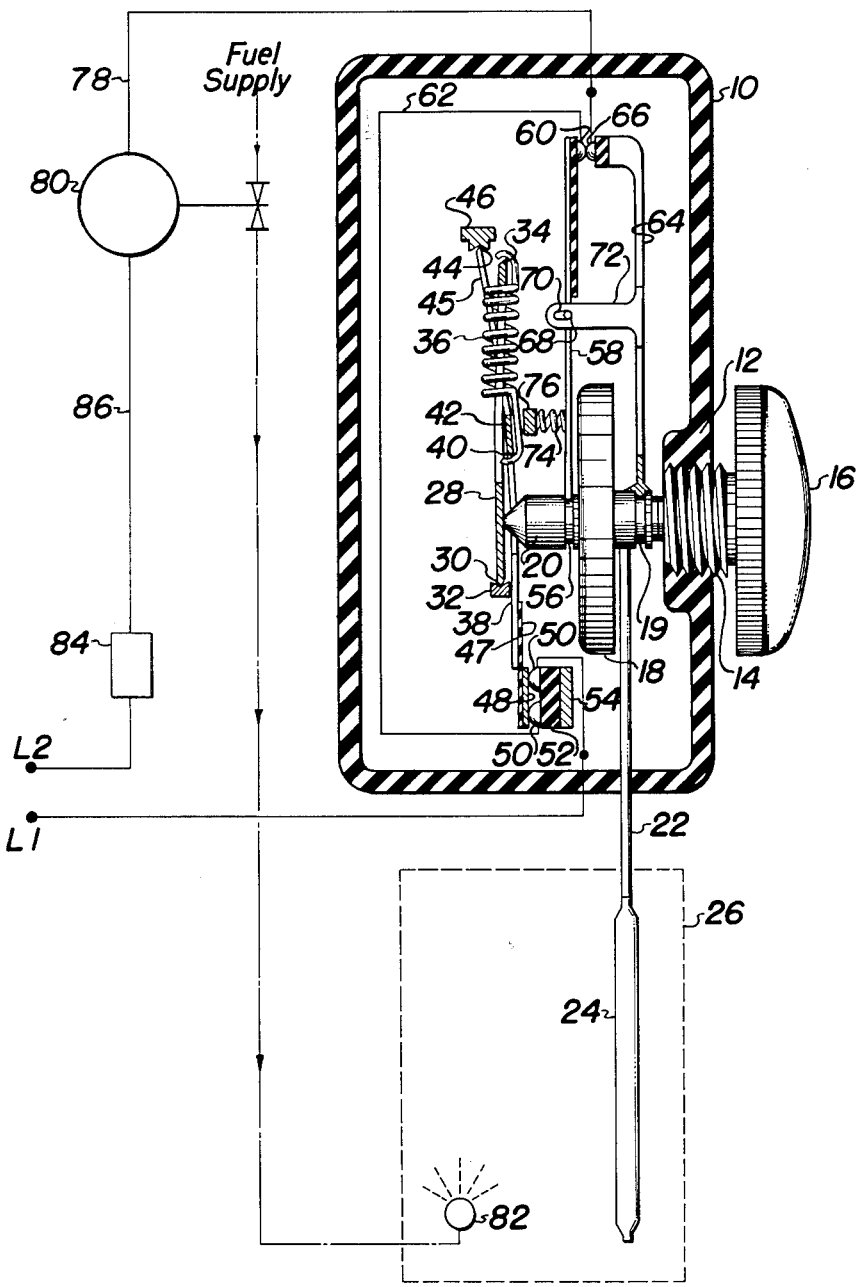
INVENTORS
Victor Weber and
William J. Russell
BY
*Albert J. Henderson*
THEIR ATTORNEY.

2,757,260

THERMOSTATIC CONTROL SWITCH AND SAFETY MEANS THEREFOR

Victor Weber, Greensburg, and William J. Russell, Jeannette, Pa., assignors to Robertshaw-Fulton Controls Company, Greensburg, Pa., a corporation of Delaware Application December 31, 1954, Serial No. 479,128

8 Claims. (Cl. 200—140)

This invention relates to thermostatic control switches and safety means therefor and, more particularly, to control switches for gas furnaces and the like.

In a gas furnace control it is customary to provide a main switch actuable between open and closed positions by a thermostatic actuating device for energizing a solenoid gas valve, thereby controlling the flow of fuel to a main burner located within a furnace chamber. The thermostatic actuating device is usually of the bellows type which has been charged above atmospheric pressure and which when expanded opens the circuit to the solenoid valve and when contracted serves to close the switch for eventual opening of the valve. However, in the event that the thermostatic actuating device ruptures, the tendency of the bellows is to collapse and actuate the main switch to the position that would normally be present if the bellows was contracted. In such collapsed or ruptured position the main switch would be moved to a closed position as indicative of a demand for more heat and the supply of fuel would continue to flow to the main burner. Obviously, this is not a "fail safe" type of operation.

An object of the present invention is to retain the operating features of prior controls but to insure complete shutdown or "fail safe" operation of the control system in the event of rupture of the bellows, capillary tube, or bulb.

A preferred structural embodiment discloses a snap-action member which operates a main switch between controlling positions for energizing a solenoid valve. A thermostatically actuated device in the form of a bellows is operatively connected to the snap-action device for controlling the positioning of the contacts of the main switch in response to temperature variations in a furnace chamber. Another switch is connected in series with the main switch and is normally biased to a closed position. One contact of the second switch is connected to one end of a lever arm while the other end thereof is connected to the bellows to be moved therewith during the normal operation of the bellows from maximum to minimum temperatures. Upon collapsing of the bellows such as by puncture or leakage of fluid, the lever will be pivoted thus opening the second contacts thereby opening the circuit to the solenoid valve which will close to prevent the flow of fuel to the main burner.

Another object of the invention is to facilitate assembly and disassembly of the control switch by housing the switch parts in a single casing having a minimum of parts.

Other objects and advantages will become apparent from the following description taken in connection with the accompanying drawing, which is a schematic view generally in cross-section of a furnace control embodying the invention.

Referring more particularly to the drawing, there is shown a rectangular casing 10 of insulating material provided with an internally threaded boss 12 on one side for receiving therein an adjusting screw 14. The adjusting screw 14 is provided with threads cooperable with the internal threads of the boss 12 and carries on its exterior end the usual knob 16 by means of which the adjusting screw 14 can be rotated.

Temperature responsive means in the form of an expansible and contractable diaphragm element 18 is carried on a connecting pin 19 and has an operating button 20 projecting therefrom. The interior end of the adjusting screw 14 is suitably apertured to receive the pin 19 for slidable engagement therewith. The arrangement is such that upon rotation of the knob 16, the diaphragm element 18 and button 20 will move axially. The interior of the diaphragm 18 is in communication with the capillary tube 22 which extends exteriorly of the casing 10 for communication with the usual bulb element 24 to be located in a furnace chamber 26. As is well known, the temperature responsive means is charged above atmospheric pressure with a fluid which expands upon the bulb 24 being heated and serves to actuate the diaphragm sufficiently to operate the parts now to be described.

The button 20 abuts a face of a main actuating lever 28 of a snap-action means. The main actuating lever 28 is provided at one end with a knife edge 30 which is cooperable with a support 32 extending from the casing 10. The opposite end of the lever 28 is also provided with a knife edge 34 around which one end of a coil spring 36 is hooked.

A main control lever 38 is mounted longitudinally in the casing 10 and is provided with a knife edge 40 formed in an intermediate portion 42 thereof for receiving the opposite hooked end of the coil spring 36. The upper leg 45 of the control lever 38, is provided with a knife edge 44 for cooperation with a suitable bearing formed on a mounting element 46 supported in the casing 10.

It will now be apparent that the minimum and maximum temperature range in the furnace chamber 26 may be raised or lowered by adjusting the knob 16 to the desired temperature limit. This adjustment in turn, will position the button 20 at a smaller or greater distance from the snap point of the lever 28 by means of the screw 14 driven by the knob 16.

The lower leg 47 of the control lever 38, is insulated from the upper leg 45 and carries a contact bridge 48 for cooperation with a pair of fixed contacts 50 carried by the casing 10. The contacts 50 are secured to an insulating pad 52 which is mounted on a post 54 projecting from the casing 10. One of the contacts 50 is connected to a lead line L1 while the other is connected to a conductor and switch to be described hereinafter.

Detachably secured in a peripheral groove 56 formed in the operating button 20 is one end of a switch arm 58 formed of any suitable rigid insulating material. Remote from its connection with the button 20, the switch arm 58 carries a contact 60 which is disposed on one side thereof and is connected by a conductor 62 to one of the contacts 50. An angular arm 64 is secured by any suitable means to the diaphragm connecting pin 19 and extends longitudinally of the casing 10 substantially parallel with the switch arm 58. The other end of the arm 64 remote from its connection with the mounting means 19 has mounted thereon a contact 66 which is adapted to cooperate with the contact 60. A pivot 68 is provided on the arm 58 intermediate the ends thereof and is pivotally and slidably received in a small slot 70 formed in one end of a bracket 72 which is secured to the arm 64. A coil spring 74 held in compression between a mounting post 76 projecting from the casing 10 and one side of the arm 58 normally biases the same so that the pivot 68 is held toward one end of the slot 70 and the contacts 60, 66 are closed during the normal operation of the diaphragm element 18. During the normal contracting and expanding range of the element 18 between the minimum and maximum temperatures respectively set by the knob 16, the switch arm 58, since it is connected at one end to the button 20, will move therewith, and since the pivot 68 is free to slide between both extremities of the slot 70, the contacts 60, 66 will remain closed under the bias of the spring 74.

The contact 66 is connected as by a conductor 78 to the energizing coil of a solenoid valve 80 which is designed to control a supply of fuel to a main burner 82 located within the furnace casing 26. The solenoid valve 80 is connected to a conventional room thermostat 84 by a conductor 86 and to complete the furnace control circuit the other side of the thermostat is connected to a line wire L2.

*Operation*

When fuel is flowing to the furnace burner 82, the various parts of the control device are positioned as shown in the drawing wherein, the solenoid valve is energized to an open position by the closed circuit traced as follows: lead line L1, contact 50, bridge 48, contact 50, conductor 62, contact 60, contact 66, conductor 78, solenoid 80, conductor 86, thermostat 84 and lead line L2.

The diaphragm element 18 is in the contracted condition but is expanding as the heat surrounding the bulb 24 increases. When the temperature in the furnace chamber 26 reaches the maximum limit which has been preselected by the knob 16, then the control will operate thermostatically. That is, the diaphragm 18 will expand sufficiently to cause the overcenter snap action of the control lever 38 to the left as viewed in the drawing causing movement of the bridge 48 to the left. Consequently, the circuit previously traced is broken and the solenoid valve 80 is deenergized to prevent the flow of fuel to the main burner 82 until the diaphragm 18 again contracts to allow the main actuating lever 28 to move with the button 20 causing the control lever 38 to snap to the right as shown in the drawing and allow the bridge 48 to come in contact with the contact 50 in another cycle of operation.

In the normal operation of the parts thus discussed, the switch arm 58 normally "floats" with the movement of the button 20 under the bias of the spring 74 so that the pivot 68 is free to slide in the slot 70 and contacts 60, 66 remain closed. However, in the event of rupture of the bellows 18, capillary 22, or the bulb 24, the end of the switch arm 58 adjacent the button 20 will be moved to a position beyond that which it would occupy at maximum normal contraction of the bellows 18. In moving to such position, the switch arm 58 will be pivoted about the pivot 68 thus separating the contacts 60, 66 and opening the previously described circuit to the solenoid valve 80. The supply of fuel to the main burner 82 will be closed by the deenergization of the solenoid valve 80 and the apparatus is in fail-safe condition.

Many modifications and changes in details of construction and arrangement of parts may be made within the scope of the appended claims.

We claim:

1. A thermostatic control device comprising a switch means having a plurality of controlling positions, thermally responsive means including a member movable in opposite directions in response to an increase and decrease respectively in a temperature condition, and operative connection between said switch means and said member for moving said switch means to one of said controlling positions in response to movement of said member in one of said directions and for moving said switch means to another of said controlling positions in response to movement of said member in the other of said directions, second switch means having a plurality of controlling positions, a pair of levers carrying said second switch means, one of said levers being connected to said member and movable in opposite directions therewith in response to changes in a temperature condition, the second of said levers being mounted adjacent said member and movable therewith, means biasing said first-mentioned lever toward said second lever to move said second switch means to one of said controlling positions, and means slidably and pivotally interconnecting said levers for actuating said second switch means to another of said controlling positions in response to further movement of said member in one of said directions.

2. A thermostatic control device comprising a circuit, a switch means connected thereto having a plurality of controlling positions, thermally responsive means including a member movable in opposite directions in response to an increase and decrease respectively in a temperature condition, an operative connection between said switch means and said member for moving said switch means to one of said controlling positions in response to movement of said member in one of said directions and for moving said switch means to another of said controlling positions in response to movement of said member in the other of said directions, second switch means connected in series with said circuit and having a plurality of controlling positions, a pair of levers carrying said second switch means, one of said levers being connected to said member and movable in opposite directions therewith in response to changes in a temperature condition, the second of said levers being mounted adjacent said member and movable therewith, means biasing the first of said levers toward the second of said levers to move said second switch means to one of said controlling positions, and means slidably and pivotally interconnecting said levers for actuating said second switch means to another of said controlling positions in response to further movement of said member in one of said directions.

3. A thermostatic control device comprising a circuit, a switch means connected in said circuit and having a plurality of controlling positions, thermally responsive means including a member movable in opposite directions in response to an increase and decrease respectively in a temperature condition, an operative connection between said switch means and said member for moving said switch means to one of said controlling positions in response to movement of said member in one of said directions and for moving said switch means to another of said controlling positions in response to movement of said member in the other of said directions, second switch means connected in series with said circuit and having a plurality of controlling positions, said second switch means being mounted on a pair of levers, one of said levers being connected to said member and movable in opposite directions therewith in response to changes in a temperature condition, the second of said levers being mounted adjacent said member and movable therewith, means biasing said first-mentioned lever toward said second lever to normally bias said second switch means to one of said controlling positions, and means slidably and pivotally interconnecting said levers for actuating said second switch means to another of said positions in response to further movement of said member in one of said directions.

4. A thermostatic control device comprising a circuit, a switch means connected in said circuit and having a plurality of controlling positions, thermally responsive means including a member movable in opposite directions in response to an increase and decrease respectively in a temperature condition, an operative connection between said switch means and said member for moving said switch means to one of said controlling positions in response to movement of said member in one of said directions and for moving said switch means to another of said controlling positions in response to movement of said member in the other of said directions, second switch means connected in series with said circuit and having a plurality of controlling positions, said second switch means being carried by a pair of levers, an annular recess in said member, one of said levers having one end mounted in said annular recess and movable in opposite directions with said member in response to changes in a temperature condition, the second of said levers being mounted adjacent said member and movable therewith, means biasing said first-mentioned lever toward said second lever to move said second switch means to one of said controlling positions, and means slidably and pivotally interconnecting said levers for actuating said second switch means to the other of said positions in response to further movement of said member in one of said directions.

5. A thermostatic control device comprising a circuit, a switch means connected in said circuit and having a plurality of controlling positions, thermally responsive means including a member movable in opposite directions in response to an increase and decrease respectively in a temperature condition, an operative connection between said switch means and said member for moving said switch means to one of said controlling positions in response to movement of said member in one of said directions and for moving said switch means to another of said controlling positions in response to movement of said member in the other of said directions, second switch means connected in series with said circuit and having a plurality of controlling positions, a pair of levers carrying said second switch means, one of said levers being connected to said member and movable therewith in response to changes in a temperature condition, the second of said levers being mounted adjacent said member and movable therewith, means biasing said first-mentioned lever toward said second lever to move said second switch means to one of said controlling positions, means slidably and pivotally interconnecting said levers for actuating said second switch means to the other of said positions in response to further movement of said member in one of said directions, and means to adjust the temperature condition at which said switch means operates between said controlling positions.

6. A thermostatic control device comprising a circuit, a switch means connected in said circuit and having a plurality of controlling positions, thermally responsive means being operative by fluid pressure therein, said thermally responsive means including a member movable in opposite directions in response to an increase and decrease respectively in a temperature condition, an operative connection between said switch means and said member for moving said switch means to one of said controlling positions in response to movement of said member in one of said directions and for moving said switch means to another of said controlling positions in response to movement of said member in the other of said directions, second switch means connected in series with said circuit and having a plurality of controlling positions, a pair of levers carrying said second switch means, an annular recess in said member, one of said levers having one end seated in said recess and being movable in opposite directions with said member in response to changes in a temperature condition, the second of said levers being mounted adjacent said member and movable therewith, means biasing the first-mentioned of said levers toward said second lever to normally bias said second switch means to one of said controlling positions, a projection on said first-mentioned lever, a slotted arm on said second lever operatively engaging said projection to slidably and pivotally interconnect said levers for actuating said second switch means to the other of said positions in response to an abnormal drop in said fluid pressure, and means to adjust the temperature condition at which said switch means operates between said controlling positions.

7. A thermostatic control device comprising switch means having a plurality of controlling positions, thermally responsive means operatively connected to said switch means for actuating said switch means to said controlling positions as said thermally responsive means moves in opposite directions in response to changes in a temperature condition, second switch means having a plurality of controlling positions, a pair of levers carrying said second switch means, means biasing one lever toward the other lever to move said second switch means to one of said controlling positions, and means slidably and pivotally interconnecting said pair of levers for actuating said second switch means to another of said controlling positions in response to abnormal movement of said thermally responsive means in one of said directions.

8. A thermostatic control device comprising a circuit, switch means connected in said circuit and having a plurality of controlling positions, thermally responsive means operatively connected to said switch means for actuating said switch means to said controlling positions as said thermally responsive means moves in opposite directions in response to changes in a temperature condition, second switch means connected in series with said circuit and having a plurality of controlling positions, a pair of levers carrying said second switch means, means biasing one lever toward the other lever to move said second switch means to one of said controlling positions, and means slidably and pivotally interconnecting said pair of levers for actuating said second switch means to another of said controlling positions in response to abnormal movement of said thermally responsive means in one of said directions.

References Cited in the file of this patent

UNITED STATES PATENTS

| | | |
|---|---|---|
| 733,566 | Sundh | July 14, 1903 |
| 2,552,962 | Hacker | May 15, 1951 |
| 2,620,414 | Thorsheim | Dec. 2, 1952 |
| 2,643,154 | Wellman | June 23, 1953 |